United States Patent
Sanabria-Hernandez

(10) Patent No.: US 7,997,007 B2
(45) Date of Patent: Aug. 16, 2011

(54) STIMULUS TRAINING SYSTEM AND APPARATUS TO EFFECTUATE THERAPEUTIC TREATMENT

(75) Inventor: Lillian Sanabria-Hernandez, Floral Park, NY (US)

(73) Assignee: Early Success, Inc., Floral Park, NY (US)

(*) Notice: Subject to any disclaimer, the term of this patent is extended or adjusted under 35 U.S.C. 154(b) by 872 days.

(21) Appl. No.: 11/856,717

(22) Filed: Sep. 17, 2007

(65) Prior Publication Data

US 2008/0066343 A1    Mar. 20, 2008

Related U.S. Application Data

(60) Provisional application No. 60/825,732, filed on Sep. 15, 2006.

(51) Int. Cl.
    *A43B 23/00* (2006.01)
(52) U.S. Cl. ............... 36/1; 36/136; 36/137; 36/138
(58) Field of Classification Search ............... 36/1, 136, 36/114, 137, 138
    See application file for complete search history.

(56) References Cited

U.S. PATENT DOCUMENTS

| | | | |
|---|---|---|---|
| 3,702,999 A * | 11/1972 | Gradisar | 340/573.1 |
| 4,703,445 A * | 10/1987 | Dassler | 702/160 |
| 4,771,394 A * | 9/1988 | Cavanagh | 702/160 |
| 4,814,661 A * | 3/1989 | Ratzlaff et al. | 310/328 |
| 5,343,445 A * | 8/1994 | Cherdak | 368/10 |
| 5,373,651 A * | 12/1994 | Wood | 36/114 |
| 5,437,289 A * | 8/1995 | Liverance et al. | 600/592 |
| 5,471,405 A * | 11/1995 | Marsh | 702/41 |
| 5,500,635 A * | 3/1996 | Mott | 340/323 R |
| 5,566,479 A * | 10/1996 | Gray et al. | 36/137 |
| 5,615,111 A * | 3/1997 | Raskas et al. | 36/136 |
| 5,789,716 A | 8/1998 | Wang | |
| 5,812,063 A | 9/1998 | Weng et al. | |
| 5,929,332 A | 7/1999 | Brown | |
| 5,945,911 A * | 8/1999 | Healy et al. | 340/573.1 |
| 6,122,846 A * | 9/2000 | Gray et al. | 36/136 |
| 6,183,425 B1 * | 2/2001 | Whalen et al. | 600/592 |
| 6,273,863 B1 * | 8/2001 | Avni et al. | 600/587 |
| 6,280,045 B1 | 8/2001 | Anteby et al. | |
| 6,405,606 B1 | 6/2002 | Walczyk et al. | |
| 6,808,462 B2 * | 10/2004 | Snyder et al. | 473/422 |
| 7,310,895 B2 * | 12/2007 | Whittlesey et al. | 36/137 |
| 7,433,805 B2 * | 10/2008 | Vock et al. | 702/188 |
| 7,552,549 B2 * | 6/2009 | Whittlesey et al. | 36/127 |
| 7,607,243 B2 * | 10/2009 | Berner et al. | 36/136 |
| 7,713,173 B2 * | 5/2010 | Shin et al. | 482/8 |
| 2003/0009308 A1 | 1/2003 | Kirtley | |
| 2005/0184878 A1 * | 8/2005 | Grold et al. | 340/573.7 |
| 2008/0203144 A1 * | 8/2008 | Kim | 235/105 |
| 2008/0282580 A1 * | 11/2008 | Ji-Woog | 36/140 |
| 2008/0287832 A1 * | 11/2008 | Collins et al. | 600/587 |
| 2009/0284368 A1 * | 11/2009 | Case, Jr. | 340/539.1 |
| 2009/0293319 A1 * | 12/2009 | Avni | 36/132 |
| 2010/0154255 A1 * | 6/2010 | Robinson et al. | 36/127 |

* cited by examiner

*Primary Examiner* — Marie Patterson
(74) *Attorney, Agent, or Firm* — Andrew F. Young, Esq.; Lackenbach Siegel, LLP

(57) ABSTRACT

The invention provides a compactly contained multiple-component sensing device for detecting toe-walking and other physical conditions and providing repetitive positive reinforcement stimuli to correct the same. A comprehensive software system enables therapeutic management of the sensing and stimulus device and easy changes in therapy, stimulus content, stimulus frequency and other factors. A variety of circuit and housing arrangements allow adaptability to manufacture, user, and treatment professional demands.

12 Claims, 3 Drawing Sheets

Fig. 3
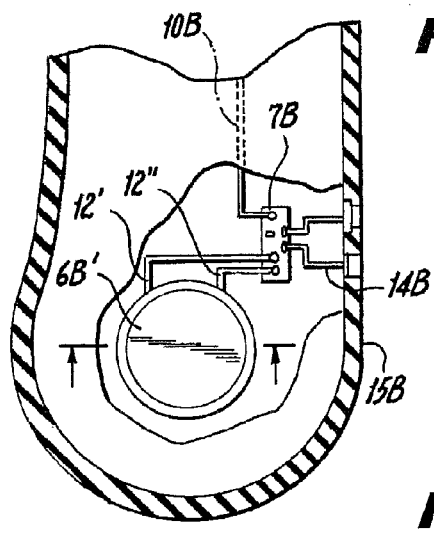
Fig. 3a
Fig. 3b
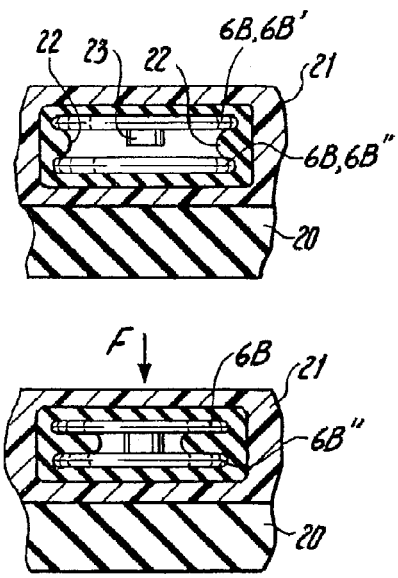
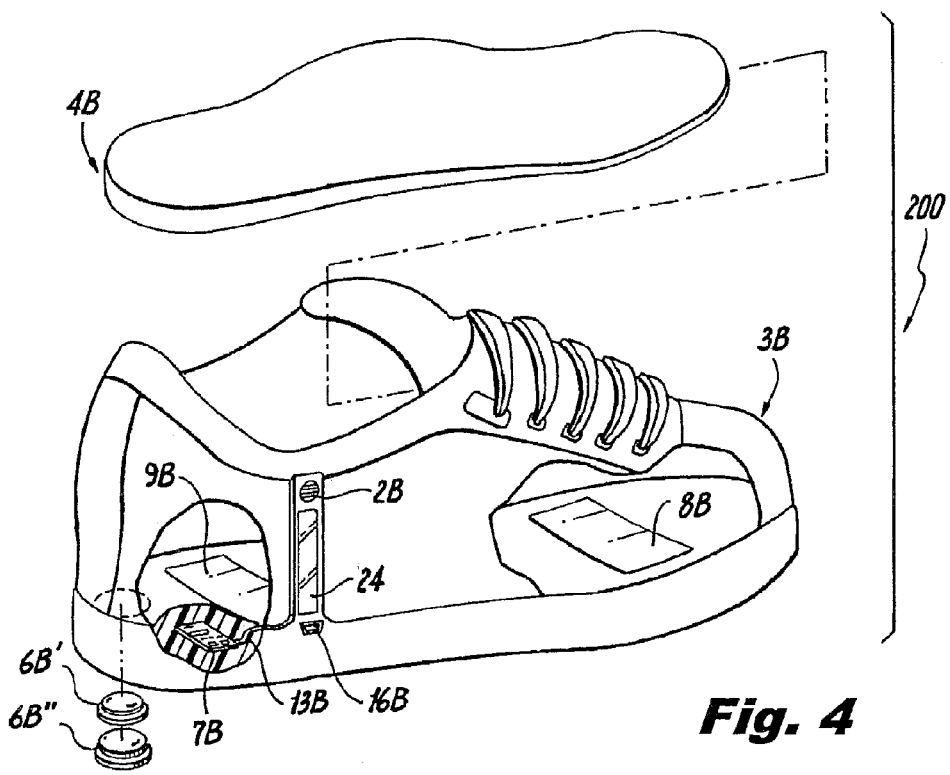
Fig. 4

STIMULUS TRAINING SYSTEM AND APPARATUS TO EFFECTUATE THERAPEUTIC TREATMENT

CROSS REFERENCE TO RELATED APPLICATIONS

This application relates to U.S. Provisional Patent Application Ser. No. 60/825,732, filed Sep. 15, 2006, the contents of which are incorporated herein by reference in their entirety.

FIGURE SELECTED FOR PUBLICATION

FIG. 1B

BACKGROUND OF THE INVENTION

1. Field of the Invention

The present invention relates to a method and system for mitigating undesirable "toe-walking" and or "heal-walking" by training; namely prompting an auditory stimulus as positive reinforcement when pressure is placed on an inappropriate portion of the foot. More specifically, the present invention relates to a method and training system for limiting "toe-walking" or "heel-walking" action as well as a system for providing a portable adaptive technology which is client-initiated thereby creating repeated opportunities for therapeutic reminders, exercise, and stretching. Additional alternatives enable electronic tracking measures for treatment purpose and interaction with computer tracking systems.

2. Description of the Related Art

The related art involves a number of shoe innersoles and coordinated pressure sensing electronics enabling a pressure sensing to stimulate bone growth during medical treatment involving running or walking actions.

A first related art example, U.S. Pat. No. 5,929,332, to Brown, discloses a sensor shoe for monitoring the condition of strike force a foot within a shoe.

A computerized foot pressure microcomputer is provided for receiving signals from sensors and analyzing the signals to determine if a critical situation exists regarding whether or not sufficient foot pressure is applied by a walking patient for medical treatment of broken bones. The capacity to provide medication is asserted as well as the capacity for continuously monitoring foot pressure and making determinative analyses for the release of pharmaceutical products to mitigate pain based upon a calculated expectation of pain.

A second example US Pat. Pub. No. 2003/0009308 to Kertley, is directed to a combination of sensors in a shoe sole wherein data from the sensors is stored and relayed to a monitoring assessment for determining running/walking cadence and the power of the walking test subject. Principally, Kertley, provides such electronic systems as are common in the art, and notes the use of related equipment to adjust the use of medical treatment for podiatrist related injuries, namely foot injuries involving Done and joint damage.

Additionally, U.S. Pat. No. 6,405,606, to Walczyk et al., is directed to a shoe and shoe system that provides biofeedback relating to a gait vector wherein there application of stress or weight during a medical therapy is essential to the healing process of bone structures. This reference teaches the combination of a gait and forced sensor that provides some amount of physical measurement in terms of measuring a patient's force placed upon an injured limb during use. No patient sensing ability is discussed.

In an additional example of related art, children's shoewear or sandals often provide auditory stimulus when the child places pressure on a heel portion of a sandal, the auditory stimulus is made by a simple squeaky-air pressure type mechanism for entertainment (generating a "squeak-sound").

It is additionally known that children's shoes may include an LED or light mechanism light up during walking action upon each heal-pressure occurrence as an entertainment enhancement or as a safety signal during darkness. Similar mechanisms are involved in U.S. Pat. Nos. 5,789,716, 5,812,063, and 6,280,045.

What is not appreciated by the related art is the need by, and the existence of, particular disable children (and even some adults) who require medical therapy for so-called "toe walking" or "heel-only-walking" disabilities.

It is known that very young children often learn to walk by stepping on their toes in the 8-24 month range. Thereafter, non-disabled children readily learn to walk, grow out of this toe-walking process, and develop suitable heal-to-toe walking with suitable stretching of the Achilles tendon and muscular development.

Unfortunately, a small percentage of children remain as toe-walkers, namely those who continue to toe-walk beyond an expected and initial developmental stage. This continued toe-walking is often a resultant indication of those children having a mental, physical, or emotional disabilities (broadly labeled as autism). Even for those non-autistic children who lack the ability to normally terminate their toe-walking, due to hyper-activity or attention deficit disorder (ADD) for example, there is a severe limitation on the enjoyment of life and often a medical risk to their norm muscle, ligament, and bone development. In some cases, a subset of the greater whole, such toe-walking is reflected instead as also heel-walking wherein the heel is solely used for walking. Similar concerns arise for such heel-walking patients. Thus, there is a need for a therapy system and apparatus that enables timely therapeutic treatment of such inappropriate gait issues for typically children but also patients of all ages.

The related art similarly fails to recognize the detriment of employing short-term human-only vocal reminders for gait-training, for example to place a heal-first while walking, particularly for autistic or otherwise disabled persons (ADD) who will not improve (or will improve very slowly) without constant almost-ever-present reminders/stimuli to reinforce therapy. Sadly, such physical disabilities are often compounded with learning disabilities rendering conventional physical therapy difficult or impossible for some patients.

Therefore what is not appreciated by the art is the need for a system to rapidly and repeatedly train toe/heel-walkers in a manner that enables continuous and acceptable forms of physical auditory and/or electronic reminders to a toe-walking or inappropriately heal-walking patient.

What is additionally not appreciated by the related art is a training mechanism that is patient/client-initiated, and provides a positive reinforcement to a disabled subject. What is further not appreciated by the prior art is the need for an auditory stimulus that is interchangeable and downloadable while linked with a walking gait motion determining system to retrain students away from toe/heal-walking disabilities.

Finally, what is not appreciated by the prior art is the use of such systems as disclosed herein in conjunction with managing computer programs or internet communications enabling storage, tracking, monitoring, and manipulation of data throughout an entire historic time period for analysis and the management of such patient treatment (including the changing of the stimulus when a previous stimulus has lost effectiveness and other treatment variables) from a distance by skilled therapeutic and medical professionals.

Accordingly, there is a need for an improved electronic auditory stimulus to decrease toe walking in treatment of individuals and to eliminate inappropriate heel walking in overcompensated toe walker patients.

OBJECTS AND SUMMARY OF THE INVENTION

An object and summary of the present invention is to provide a toe walking system in clients for promoting repeated pressure using auditory stimuli as a positive reinforcer.

Another object of the present invention is to provide a portable adaptive technology that is client initiated thereby creating a repeated opportunities for therapeutic exercise/stretching. It is recognized that walking provides essential Achilles ligament stretching for proper physical development in young children.

Another object of the present invention is to provide a medical treatment system enabling monitoring of a patient's toe walking or heel pressure. The reflection of such data via an electronic communication system to a distant medical treatment professional who monitors and provides therapeutic adaptation based on such data.

Another object of the present invention is to provide a system and method for correcting heel preference walking or-heel walking resulting from the overcorrection of toe walking or from an initially diagnosed heel-walking disability.

The present invention relates to a method and system for treating and monitoring toe walking in patients. The present invention provides a replaceable insole containing electronic components having the capacity to determine the initial pressure area on a foot bed and the calculation of whether or not to release an auditory or other stimuli to a patient in an effort to trigger heel-first walking.

The present invention also enables ready client-initiated stimulus—for example a recorded parent's voice stored in a computer audio file. Similarly such auditory stimulus may be readily updated and changed when a previous stimulus has lost its effectiveness, or when auditory signals are desirably combined—for example a recorded horn or whistle signal to gain attention and then a recorded parent-instructive voice encouraging correct walking behavior. It will be recognized that such treatment is necessarily client-initiated (by trying to walk) and so is readily adapted to client activity. A computerized memory enabled changed stimulus for treatment purposes (expanded, changed, divergent or timed audio treatment).

According to one embodiment of the present invention, there is provided: a stimulus training system, for treating a selected walking gate of a user, comprising: housing means in a footwear member for containing a plurality of interconnected operational components for generating a stimulus to said user during an operational use; said housing means including at least one of an insole member and a shoe bed member, whereby said components are retained interconnected operational components comprising: micro-controller operating system means for providing an operational control of said stimulus training system; and sensing-switch means for sensing said walking gate of said user; power supply means for supplying an electrical power to conduct said operational use of said simulated training system enabling said operational upon a selected walking gate of said user; means for electronically communicating with said micro-controller operating system means, whereby said micro-controller system may be electronically updated from an external source and store data for download by said external source, and stimulus means for providing a training stimulus to said user, said training stimulus being at least one of an auditory stimulus, a physical stimulus, and a visual stimulus, a combination of audio, physical or visual stimulus, and an electrical stimulus to a user of said therapeutic device, whereby during said operational use said micro-controller operating system means enables the generation of said training stimulus at every stepping activity of said user thereby enhancing treatment of said user.

The above, and other objects, features and advantages of the present invention will become apparent from the following description read in conduction with the accompanying drawings, in which like reference numerals designate the same elements.

BRIEF DESCRIPTION OF THE DRAWINGS

FIG. 3 is a partially cut-away view of a second alternative stimulus gait training system within a shoe base member in a shoe.

FIG. 3A is a sectional view along line 3A-3A in FIG. 3 noting an electrical and sensor connection in an open or neutral position.

FIG. 3B is a view of FIG. 3A in a closed or engaged position.

FIG. 4 is a perspective exploded view of the embodiment of FIG. 3 having an additional external indicator member.

DETAILED DESCRIPTION OF THE PREFERRED EMBODIMENTS

Figures 1, 1A:
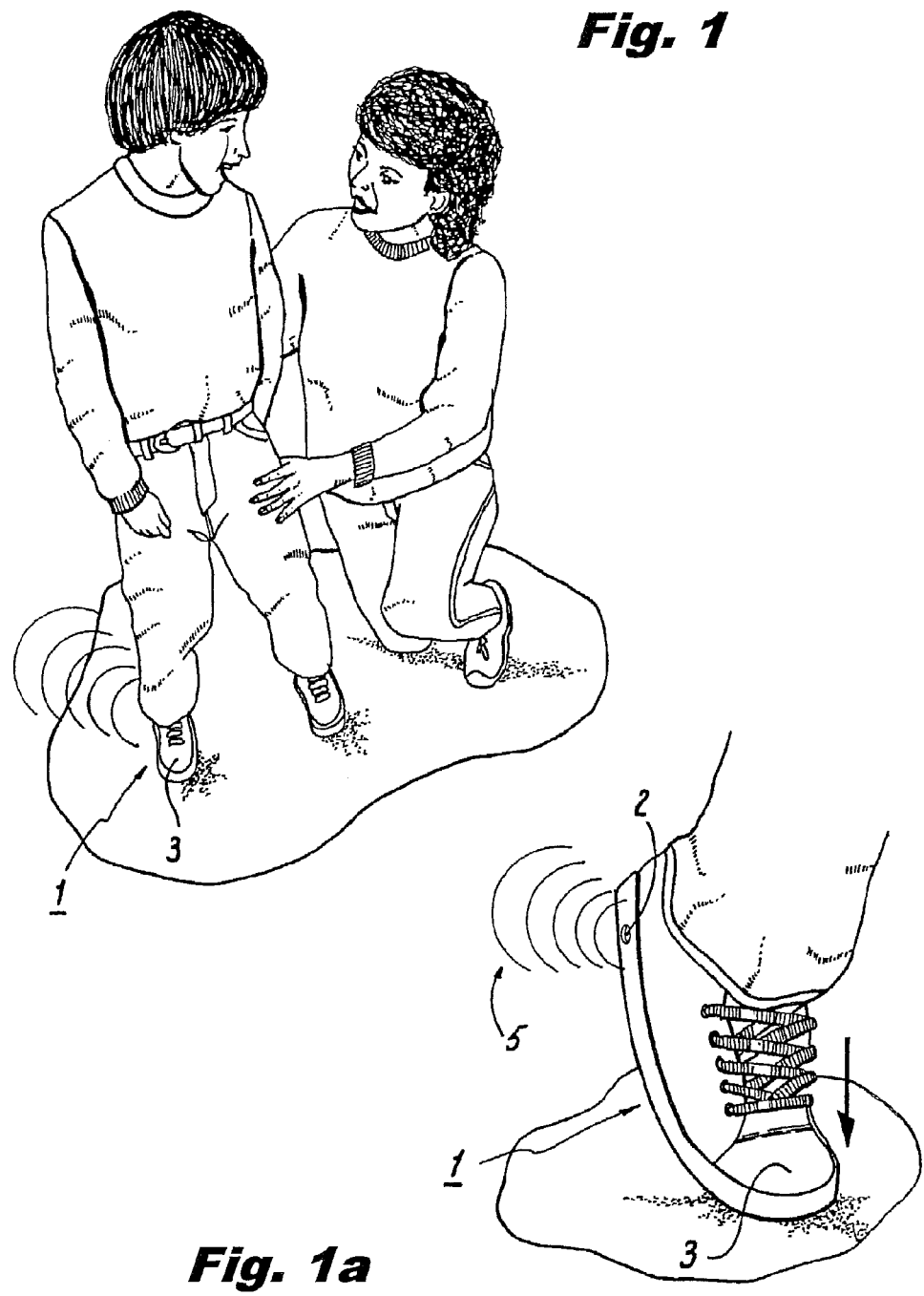
FIG. 1 is a perspective image of a patient-child wearing a stimulating apparatus sensing toe-walking according to one embodiment of the present invention.
FIG. 1A is a close-up view of the heel of the patient-child noted in FIG. 1 indicating the triggering of a gait reminder stimulus.

Reference will now be made in detail to several embodiments of the invention that are illustrated in the accompanying drawings. Wherever possible, same or similar reference numerals are used in the drawings and the description to refer to the same or like parts or steps. The drawings are in simplified form and are not to precise scale. For purposes of convenience and clarity only, directional terms, such as top, bottom, up, down, over, above, and below may be used with respect to the drawings. These and similar directional terms should not be construed to limit the scope of the invention in any manner. The words "connect," "couple," and similar terms with their inflectional morphemes do not necessarily denote direct and immediate connections, but also include connections through mediate elements or devices.

Referring now to FIGS. 1 and 1A a stimulus training and walking gate monitoring system 1 is provided with a shoe member 3 housing a speaker member 2 for producing an audio signal 5 upon a desired trigger of the operational system therein. As shown in FIGS. 1 and 1A, a sound is generated with a user's foot in the toe-walking or toe-step-first position absent the use of a heel-step first.

Figure 1B:
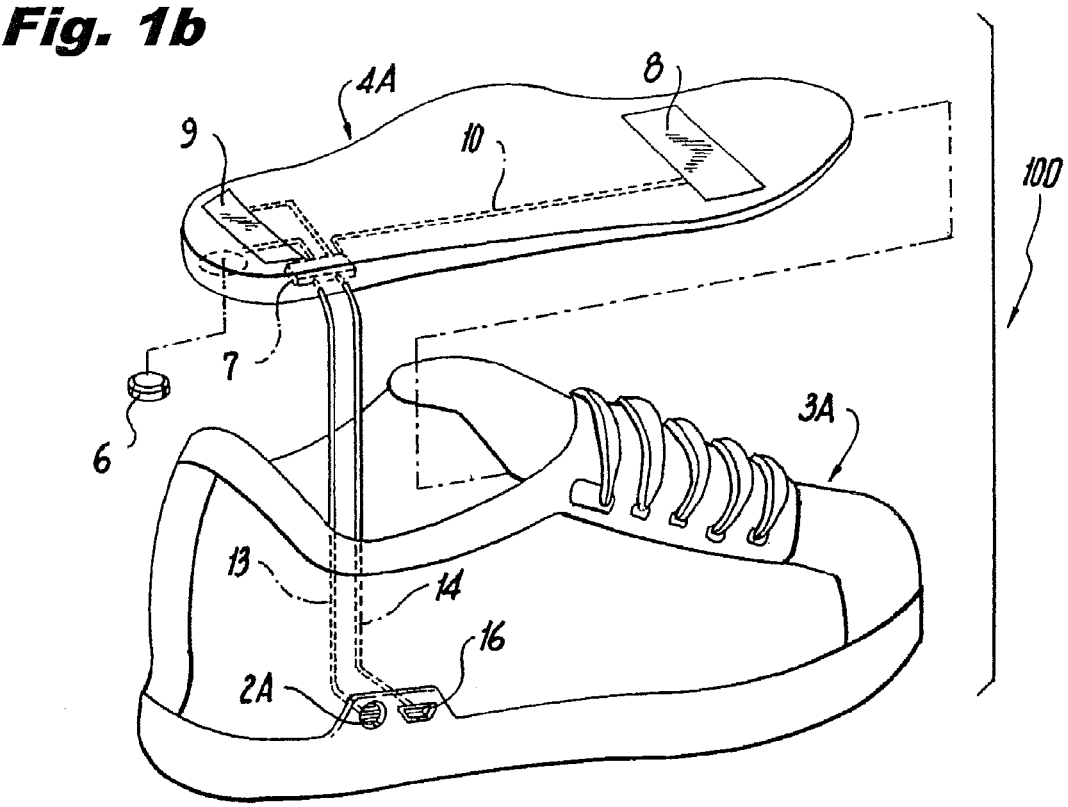
FIG. 1B is an exploded perspective view of a stimulus gait training system according to one embodiment of the present invention.
Figure 2:
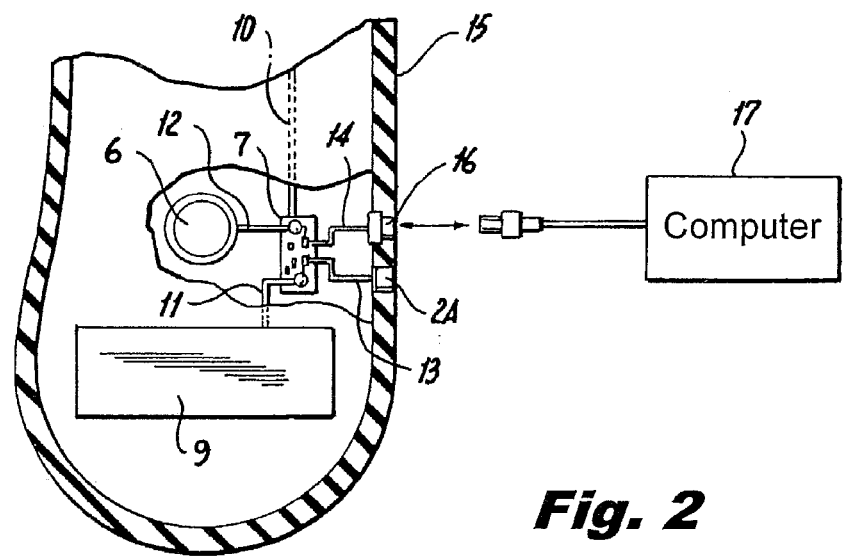
FIG. 2 is a partially cut-away view of a stimulus gait training system of FIG. 1B within a shoe insole member in a shoe.

Referring now to FIGS. 1B and 2, an alternative stimulus training and walking gate monitoring system 100 is provided with a shoe member 3A incorporating an insole member 4A operating as a circuit housing containing a plurality of system components including a power supply 6 connected by a power supply lead 12 to microchip controller system member 7 containing a plurality of electronic components (not shown). The electronic components within controller system member 7 include one or more microchips, a computer memory, a power management system component, a computer communication component (for linking with an external computer 17 via a computer connection port 16 linked by a computer connection lead 14 through a shoe bed side wall 15 (as shown).

Also contained therein is a toe sensor member 8 lined by a toe sensor lead 10 and a heel sensor member 9 similarly linked by a heel sensor lead 11 for linked to controller system member 7 for operational sensing and control.

An external speaker member 2A is linked by speaker lead 13 for annunciating an audio signal to the wearer of shoe member 3.

In this embodiment, it is noted that the entire system 100 is substantially retained within insole member 4A but for the necessary connections for external computer programming and down load control and for the necessary generation of an audio signal external to the shoe.

Such connections, to audio generator 2A and to computer access portal 16 are envisioned to be made via simple mechanical connections by a user during insertion of the insole in the shoe. Thus, the present invention envisions such connections to be made via simple pressure contacts, via hard wire, via short-distance wireless connections and in other ways of transmitting electronic signals known to those of skill in the programming arts, without departing from the scope and spirit of the present invention.

During use, it will be readily appreciated that toe sensor member 8 will sense the occurrence of a toe-pressure prior to a heal sensor trigger via heal sensor member 9. The type of signal for irregular or toe-walking gate will be stored in the computer memory and when the triggered stimulus matches the type of signal an audio signal will be generated and transmitted to audio speaker member 2A for release of the reinforcing audio signal. For example, a pre-recorded sound ("beep"), a recorded instruction ("heel-first, please") or other signal.

Additionally, while stimulus training system 100 notes the inclusion of a single power multiple or different power sources may be employed and connected in the circuit without departing from the spirit and scope of the present invention.

Referring now to FIGS. 3, 3A, 3B, and 4, an alternative stimulus training and walking gate monitoring system 200 is provided with a shoe member 3B incorporating an insole member 4B operating solely as an insole while protecting a circuit housing contained in the shoe or foot bed of the shoe member 3B itself within a shoe bed inner layer 21 above a shoe bed tread layer 20.

A plurality of system components including a power supply 6B containing individual battery members 6B', 6B" connected by respective power supply leads 12', 12" to microchip controller system member 7B which containing a plurality of electronic components (not shown). The electronic components within controller system member 7B are discussed as above and herein, and may include one or more microchips, a computer memory, a power management system component, a computer communication component (for linking with an external computer via a computer connection port 16B linked by a computer connection lead 14B through a shoe bed side wall 15B (as shown).

Also contained therein is a toe sensor member 8B linked by a toe sensor lead 10B, and a heel sensor member 9B similarly linked by a heel sensor lead (not shown) for linking to controller system member 7B in the foot bed layer 21 for operational sensing and control as discussed herein.

An external speaker member 2B is linked by speaker lead 13B for annunciating an audio signal to the wearer of shoe member 3B. Additionally, a visual display and support member 24 is employed to provide one of a visual signal (via a light emitting diode (LED) source) and a vibratory signal (via an eccentric cam member not shown) during annunciation with speaker member 2B and additionally supports speaker 2B closer to a user's foot away from floor debris. In this manner, it is envisioned that the preferred audio signal is protected and enhanced, while one or both of a light and a vibratory signal are simultaneously generated for enhanced feed back for particularly disabled users.

It will be recognized that computer 17 and programming within computer controller members 7, 7B may be adapted to track, store, and output to a treatment professional a history of use within a desirable time period. For example, a patient could download their gait-walking history (toe-walking, heel-walking, or any combination thereof) for a time period (a week) and email the same to a treatment professional who could track improvement, issue new treatment instructions, and re-record a new audio trigger, to improve patient behavior. It will be recognized that such treatment options enable the treatment professional to determine when a toe-walking gate is improving based on frequency, and when to change or improve treatment to prevent over treatment and damage to a patient.

As an additional security measure to reinforce heal-first walking, it will be noted that power sources 6B' and 6B" are spaced by elastomeric distancing protuberances 22, 22 during a non-compression condition and therefore space a contact member 23 preventing triggering contact (See FIG. 3A). However, upon compression via force F, elastomeric protuberances 22, 22 compress enabling electrical contact and completion of the circuit and, as programmed, may trigger an audio signal. While this battery arrangement is shown in a heel-condition, this type of closing-circuit may be employed additionally as either of the heel or toe sensors without departing from the scope and spirit of the present invention. Additionally, this type of battery condition may be employed as a power-saving feature preventing false use when shoe member 3B is not in a use-condition.

Referring generally now to the overall components, it will be recognized by those of skill in the art that the components, even including the speakers (although not preferably) may very likely reside within the housing itself (even within the insole housing itself). Those having studied the disclosure and understanding the consumer product arts will recognize that proposed "step with it" system is preferably self-contained unit consisting of several principal components, those components being the housing, the microchip systems, the power supply/switch systems, a mini-communication system, namely a mini-USB/and software system, and a speaker/audio/other stimulus creating system.

The first component, the overall housing, notes that all the components noted minus the speakers will likely reside within the footwear/insole involved as a housing as a part of the convenient design (or where the housing is a portion of a shoe body and a portion of an insole, within such portions). The housing will appear basic initially but maybe adapted with additional design improvements to smoothly integrate within the overall product (footwear/insole) as may be required for medical treatment or for user-design preference.

When employed as an insole, the proposed insole-housing should resemble some form of shoe insert or medical treatment insole or potentially even integrally incorporated into a shoe body. A toe end of the insole housing (shoe or insole) namely the sacrificial region will have markings showing a user where to cut or trim the actual shoe and/or insole housing member for a clean fit without damaging the system components. This will enable users to employ a single insole in a wide range of footwear for minimal costs without departing from the scope of the present disclosure.

As an insole, the housing will consist of a composite similar to foam or a composite or composition or combination thereof common in the shoe-insole arts, even the orthopedic insole arts, wherein the heel or a narrow section will be slightly thicker or firmer than the corresponding or respective end portions. This is due a need to provide a supportive environment to the power switch supply, microchip and other supporting elements needing to be contained therein in a secure and non-damaging manner. The top of the housing wherein the foot will be placed will be layered with a thin material such as woven nylon that will delay wear and allow the unit to be used frequently throughout a plurality of footwear. It is also envisioned that the housing itself, or within a component housing region therein a water and vapor resistant environment may be created. For example, the use of a closed-cell foam will inhibit moisture passage to preserve the electronic switch components in the flexible insole pressure switches components known to those of the consumer product arts, such as the switches on a flexible key-pad input or within a flexible switched consumer product item such as that shown in U.S. application Ser. No. 10/888,270 for a flexible keyboard the entire contents of which are incorporated herein by reference as to circuitry and operation.

The microchip system represents the operational technology and/or adjustable brains of the present system and will be housed, it is expected, within a polymer/resin static-free casing connected to or proximate to the aforementioned power supply/switch depending upon design considerations. It will be microchip based command and operational control center, and will be needed for processing of commands for various data storage, sound storage, programming language storage, and generation retrievable systems, USB and other communication systems and the sending of said information to a speaker or other stimuli stimulator generator when triggered there through. It is envisioned that the memory or electronic memory herein will be relatively small but sufficient for purpose, as well as containing enabling software for connectivity, sound storage files, and the storage of other data and programs and material necessary for adapted embodiments of the present invention.

A third component of the present invention is the power supply and power switch systems. The power supply and/or switch or trigger system will be combined and positioned for convenient placement within the housing (in hole or part) and likely positioned inside the heel section adjacent to the aforesaid microchip member. The power supply may consist of optionally two large flat circular lithium ion batteries that will be stacked or hinged together enabling movement-for-contact type action. According to one aspect of the present invention both battery members will be spaced by an elastomeric component and will make contact with a contact switch member upon compression of the elastomeric component when pressure is applied to one battery by a patient's toe, heal or both, thereby completing an electronic circuit containing the batteries and enabling operations. It is also envisioned that the microchip control system itself may retain internal power supply for maintenance memory and other system actions as will be discussed. It is also envisioned, that such a construction may be optionally positioned within the toe portion of the housing without departing from the skill in the art. It is additionally envisioned, that similar constructions may be positioned within both the toe and heal portions and be in communication with each other enabling manufacturer convenience as to placement and design.

Where two power supply or switch systems are used in the toe/heal orientation, they will be in joint or parallel communication with the controlling microcontroller to enable ready detection of either proper walking or improper/proper heal-heal (without toe contact) or toe-toe walking (toe only contact), or toe-heal contact (improper contact order) and heal-toe contact (proper gait order).

In alternative USB/software guidance and communication systems, the additional mini-USB/software system will be in communication with the microchip, power supply and housing and is preferred in a mini-USB-type embodiment. Such an embodiment will allow for the transfer of custom sounds or commands as stimuli to the unit as well as miscellaneous data connection, data collection and transfer.

The software suggested within the present disclosure will be of a universal desktop software variety but may be custom crafted to record and manage data and sound files without departing from the scope of the present system, will be user friendly, and will preferably enable both windows and a macintosh type platforms. Such a mini-USB software component and port, or even a wireless communication portal (transmitter) will assist a client or user to create and edit sounds or other stimuli during the processing of the system. Such a system will also provide for the delivery of communication between the attendant computer and the unit.

It is also proposed that the proposed communication system allows the user to create and edit and manage sounds (order, intensity, tone, etc.) for the unit and provide realistic playback. It will also provide drivers for communication systems between computer, transmission units and an overall medical management unit should one be installed. It is envisioned, however, that the audio stimuli may include sounds, clicks, horns, sirens, rhythmic music tones as well as pre-recorded voice instructions or voice encouragements of numerous varieties (Mom's, Dad's voice etc.). It is also envisioned that the transmitted audio stimuli may be selected by a software system within the housing based upon a received step process and force.

In one alternative embodiment it is also believed that telecommunication systems within each device or each insole, may communicate between insoles as well as with a macro system.

An additional element within the present invention is the speaker or audio hardware device as well as the associated electronic wiring system. It is proposed herein that the speaker device for the audio delivery as discussed herein will be in the direct vicinity of the user's foot, heel, or insole heel to thereby allow sound to be heard by the user unit. See, for example, several of the drawings included herein. The present electronic components are of study design to endure use with adolescent patients.

Those skilled in the art of generating compact electronic communication and teaching devices will rarely find it apparent within the art to find small and sturdy audio and speaker systems. It is also proposed that a small and reasonably flexible tube may house a wire in an alternative embodiment to pass power to a speaker at an alternative shoe opening (for example a shoe side opening outside the housing) to thereby allow ready transmission of sounds outside the shoe and away from the insole for ready hearing.

It is also believed that those skilled in the art will readily recognize that alternative embodiments may incorporate reasonably related reference materials as will be discussed herein. It is known to those skilled in the art that children's sandals and small shoes provide auditory should when pressure is placed upon a heel portion of the shoe (regardless of pressure-order or toe-toe walking condition). Examples of such stimuli may include a simple squeak or chirp mechanism. It is also known that children's shoes may have a heel light or LED light motion that lights up when a heel strike is placed upon a child's shoe. Mechanisms involved in such simple auditory and electronic stimuli are known in U.S. Pat. Nos. 5,789,716 and 5,812,063 and 6,280,045, the contents of each of which is fully enclosed herein by reference.

One of the advantages of the present invention over the current state of the art is that adaptive equipment that already exists including orthodics, splints and/or braces are typically used for toe injured or physically disabled children only at night or with very special, clunky, and difficult to wear foot wear. Such devices provide physical support or control of the foot as a pre-requisite.

The advantages of the present invention include the provision of the opportunity for easy and simplified client initiated therapeutic exercise to lessen toe walking while using regular footwear. Another advantage of the present invention is that it provides the ability to track and monitor progress using computer software or electronic systems that work with the electronic manager system to track and record the patient's use and improvement or rate or decline.

It is another advantage of the present invention that the preferred embodiment, wherein the electronic systems are contained within removable and replaceable insoles, is that these insoles may be removed and placed in different types of shoes (re-usable and repositionable) and may be physically trimmed within reasonable ranges to fit in different shoe sizes (usable for a range of patient ages and sizes). Further more, these devices may be produced at a much lower cost and may therefore be readily replaced at a lower cost and yet readily adapted to a wide range of patients.

It is believed that at least one specific use of the present invention would allow at least one insole within a patients shoe or foot wear to prompt through toe walking use, those patient's who place a first pressure on a toe of their foot to receive the opportunity to be stimulated either audibly or physically (or a combination) and so be prompted to strike with their heel first on the very next step.

Another specific use of the present invention is that it provides a substantial benefit in therapy over the prior art. In the present invention, patients are stimulated to remind them immediately (the very next step) with auditory stimuli to strike with their heel first most preferably with the audible voice of a experience.

Another benefit is that the present electronic system includes the ability to "know" or recognize when each step is occurring and thereby should a patient strike with their heel first no stimuli would occur on that step because they would walk heel-to-toe. However, on the very next step should the patient walk with toe first they would be promptly reminded at that step to strike with their heel on the following-next step so that there may be a reward stimulated for good stepping behavior, namely heel to toe behavior, and a reminder stimulated for improper behavior namely toe to heel behavior. It is therefore envisioned that the present invention will also enable therapeutic use to retrain those who have learned so well to walk on their heels that they only walk solely heel-to-heel and do not place their toes on the ground. Therefore, it is envisioned that the present invention may also be used to remediate those patients or students who have been previously improperly trained or too vigorously trained to walk solely with their heels without departing from the scope and spirit of the present invention.

Those skilled in the art of footwear design should recognize that housings as discussed may support the components (minus the speaker which will reside on the outside of the housing), although in some embodiments the speaker/stimulus may reside in the housing. The housing, whether in an insole or in a shoe body or both will appear in a narrow and very thin cross section and will therefore easily match the thinness of a common shoe insert or foot bed.

As will be readily understood by those of skill in the art the speaker unit may be alternatively an form of cellular phone or pager type mini-speaker, and it may be able to run vertically along the back section of footwear shoe such that a small speaker may project outwardly from the rear heel of a shoe for easy hearing by a patient with an increased sound output.

In yet another alternative embodiment (not shown), the power supply sources (thin batteries) may be hingably linked at one side such that their opposing sides (+/−) are pivotably separated. Such pivotal separation allows some type of hinged switch that is readily compressed by a patient's heel during a heel strike action such that when a heel strike action is missing from each step, it is "known" and recognized by the circuit which is powered thereby triggering the pattern of reinforcement. It is readily understood that the toe stepping action may generate an audible or physical stimuli (such as vibration) despite heel stepping under selected physical therapeutic remedies and with particular operational programming.

It is therefore vitally important for those skilled in the art to readily understand that the present invention includes embodiments wherein a fully powered circuit is existent throughout the entire step process whether or not a toe strike or a heel strike is first recognized by the processing unit.

In an example, a power electronic switch may receive the lack of a stimuli as a signal wherein a heel strike is missing prior to a toe strike and therefore trigger the effective stimuli generation. In an alternative situation, a toe strike may be received principally thereafter followed by heel strikes such that the present device will enable the selection of an alternative auditory reward signal whereby the patient is rewarded for remembering to place their heel downward after despite an initial toe strike. Therefore, the present invention enables the use of step or tiered/layered reward systems wherein a patient that is initially/solely a toe stepper and receives a first level of audible stimuli reminding them to strike their heels. Thereafter, further through the course of therapy when the patient remembers to toe strike and then heel strike the patient would receive a more rewarding audible stimuli (Mothers voice) noting that the patient was taking the recommended actions.

Thereafter, further throughout the therapeutic process as the patient begins to strike their heel first prior to the toe strike different audible stimuli may be applied. Thus the present system envisions differing audible and physical throughout the therapeutic process depending upon a patient's psychology and physical state.

As discussed herein, the software that may be readily updated, downloaded and enable the transmission of data also includes the steps of managing sounds and being adjustable/controllable via a desktop or systems management level apparatus. The software also enables the transfer of various sounds, the use of time delays for the actuation of sound/physical stimulus enabling a student to take several toe steps and thereafter take a break and receive the audible stimuli to remind them to walk in a preferred therapeutic manner. Such an operational software system may also include the recordation in its memory units of the progress of the student throughout the day and thereby enable the ready download of such progress by a therapist/doctor (whether progressive or regressive progress) throughout the determined time period.

In any claims, means- or step-plus-function clauses are intended to cover the structures described or suggested herein as performing the recited function and not only structural equivalents but also equivalent structures. Thus, for example, although a nail, a screw, and a bolt may not be structural equivalents in that a nail relies on friction between a wooden part and a cylindrical surface, a screw's helical surface positively engages the wooden part, and a bolt's head and nut compress opposite sides of a wooden part, in the environment of fastening wooden parts, a nail, a screw, and a bolt may be readily understood by those skilled in the art as equivalent structures.

Having described at least one of the preferred embodiments of the present invention with reference to the accompanying drawings, it is to be understood that the invention is not limited to those precise embodiments, and that various changes, modifications, and adaptations may be effected therein by one skilled in the art without departing from the scope or spirit of the invention as defined in the appended claims.

What is claimed is:

1. A stimulus training system, for treating a selected walking gate of a user, said stimulus training system comprising:
   (a) housing means in an insole for containing a plurality of interconnected operational components for generating a stimulus to said user during an operational use;
   said plurality of interconnected operational components comprising:
      (i) micro-controller operating system means for providing an operational control of said stimulus training system; and
      (ii) sensing-switch means for sensing said walking gate of said user;
   (b) power supply means for supplying an electrical power to conduct said operational use of said simulated training system enabling said operational use upon a selected walking gate of said user;
   (c) communication means for electronically communicating with said micro-controller operating system means, whereby said micro-controller system may be electronically updated from an external source and store data for download by said external source; and
   (d) stimulus means for providing a training stimulus to said user, said training stimulus being at least one of an auditory stimulus, a physical stimulus, and a visual stimulus, a combination of audio, physical or visual stimulus, and an electrical stimulus to a user of said therapeutic device, whereby during said operational use said micro-controller operating system means enables the generation of said training stimulus at every stepping activity of said user thereby enhancing treatment of said user.

2. A stimulus training system, according to claim 1, wherein:
   said sensing-switch means further comprises at least one pressure sensitive switch pad operationally connected to said micro-controller operating system means and generating a signal representative of a pressure status to said micro-controller operating system upon said operational use by said user.

3. A stimulus training system, according to claim 2, wherein:
   (a) said insole includes said; and
   (b) said sensing-switch member is positioned in one of a toe portion and a heal portion of said insole.

4. A stimulus training system, according to claim 3, wherein:
   said sensing-switch member is positioned in both said toe portion and said heal portion of said insole, whereby said operational use by said user enables said generation of said signal of said pressure status to said micro-controller operating system.

5. A stimulus training system, according to claim 1, further comprising a computer connection portal means in said means for electronically communicating with said micro-controller operating system means; and wherein said computer connection portal means is an electrical memory transmission connection selected from one of a group comprising:
   (a) a wired connection portal; and
   (b) a wireless connection portal,
   whereby said at least one computer connection portal means enables an update of said training stimulus for improved training.

6. A stimulus training system, according to claim 2, wherein:
   said sensing-switch member is positioned in one of a toe portion and a heal portion of said insole.

7. A stimulus training system, according to claim 6, wherein:
   said sensing-switch member is positioned in both said toe portion and said heal portion of said insole, whereby said operational use by said user enables said generation of said signal of said pressure status to said micro-controller operating system.

8. A stimulus training system, according to claim 1, wherein:
   said power supply means for supplying an electrical power to conduct said operational use of said simulated training system comprises at least one battery.

9. A stimulus training system, according to claim 8, wherein:
   said power supply means further comprises at least a second battery.

10. A stimulus training system, according to claim 9, wherein:
    said first battery and said second battery have a relative position to each other within said housing enabling operation as a portion of sensing-switch means for sensing said walking gate of said user.

11. A stimulus training system, according to claim 9, wherein:
    said first battery and said second battery have a relative position to each other in said housing;
    said relative position enabling at least one of an elastically hingable connection and an elastically compressible connection between said first battery and said second battery, whereby during said operational use by said user said walking gate of said user enables said at least one connection, whereby said power supply means enables said first battery and said second battery to operate as elements of said sensing-switch means for sensing said walking gate of said user.

12. The stimulus training system according to claim 1, wherein said insole is replaceable.

* * * * *